United States Patent
Shan

(10) Patent No.: US 11,845,031 B2
(45) Date of Patent: Dec. 19, 2023

(54) FILTER ASSEMBLY, VENTILATION ASSEMBLY AND AIR-CONDITIONING APPARATUS

(71) Applicant: BEIJING XIAOMI MOBILE SOFTWARE CO., LTD., Beijing (CN)

(72) Inventor: Lianyu Shan, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 312 days.

(21) Appl. No.: 17/360,683

(22) Filed: Jun. 28, 2021

(65) Prior Publication Data

US 2022/0233984 A1 Jul. 28, 2022

(30) Foreign Application Priority Data

Jan. 25, 2021 (CN) .......................... 202120200828.7

(51) Int. Cl.
*B01D 46/00* (2022.01)
*B01D 46/10* (2006.01)
*B01D 46/42* (2006.01)
*F24F 13/28* (2006.01)

(52) U.S. Cl.
CPC ......... *B01D 46/0006* (2013.01); *B01D 46/10* (2013.01); *B01D 46/4227* (2013.01); *F24F 13/28* (2013.01); *B01D 2201/34* (2013.01)

(58) Field of Classification Search
CPC ............ B01D 46/0005; B01D 46/0006; B01D 46/10; B01D 46/4227; B01D 2201/34; F24F 13/28
See application file for complete search history.

(56) References Cited

FOREIGN PATENT DOCUMENTS

| CN | 108361889 A | * | 8/2018 | |
| CN | 108386927 A | | 8/2018 | |
| CN | 115013959 A | * | 9/2022 | |
| EP | 1254796 A1 | * | 11/2002 | ......... B01D 46/0006 |
| EP | 1254796 A1 | | 11/2002 | |
| EP | 1306120 A1 | | 5/2003 | |
| EP | 3734172 A1 | | 11/2020 | |
| FR | 2741568 A1 | * | 5/1997 | ......... B01D 46/0004 |
| FR | 2815699 A1 | | 4/2002 | |
| FR | 2896016 A1 | | 7/2007 | |
| KR | 2004075451 A | * | 8/2004 | ......... B01D 46/0004 |
| KR | 2004075455 A | * | 8/2004 | ......... B01D 46/0006 |

OTHER PUBLICATIONS

European Patent Application No. 21182290.3, Search and Opinion dated Dec. 20, 2021, 8 pages.

* cited by examiner

*Primary Examiner* — Robert Clemente
(74) *Attorney, Agent, or Firm* — COZEN O'CONNOR

(57) ABSTRACT

A filter assembly, a ventilation assembly and an air-conditioning apparatus are provided. The filter assembly includes: a filter screen configured to filter air; a supporting portion configured to support the filter screen arranged to the supporting portion; and a mounting portion configured to mount the filter assembly to or adjacent to a mounting port of an apparatus to be provided with the filter assembly, and a shape and a size of the mounting portion matching with those of the mounting port to cover the mounting port. The mounting portion includes a sealing part having a shape approximately the same with a shape of a gap between the mounting portion and the mounting port and has an interference fit with the gap, to seal the gap between the mounting portion and the mounting port.

18 Claims, 8 Drawing Sheets

FILTER ASSEMBLY, VENTILATION ASSEMBLY AND AIR-CONDITIONING APPARATUS

CROSS-REFERENCE TO RELATED APPLICATION

The present disclosure is based upon and claims priority to Chinese Patent Application No. 202120200828.7, filed on Jan. 25, 2021, the entire content of which is incorporated herein by reference.

TECHNICAL FIELD

The present disclosure relates to a field of electrical appliances, and more particularly to a filter assembly, a ventilation assembly and an air-conditioning apparatus.

BACKGROUND

As living standards improve, people are paying more attention to indoor air health and household air quality devices such as fresh air ventilators, air purifiers, and air conditioners with a fresh air function are becoming more and more popular. These air quality devices often need to be assembled and disassembled to replace a filter by a user on an infrequent basis and thus, require learning curve with each replacement and a greater likelihood of mistakes. Therefore, a reliable detachable ventilation assembly between the filter assembly and the device would help users successfully replace filters and maintain the device.

SUMMARY

Embodiments of a first aspect of the present disclosure provide a filter assembly, including: a filter screen configured to filter air; a supporting portion configured to support the filter screen; a mounting portion configured to mount the filter assembly to a mounting port of an apparatus to be provided with the filter assembly or to a portion of the apparatus adjacent to the mounting port, wherein a shape and a size of the mounting portion matching with those of the mounting port to cover the mounting port. The mounting portion includes a sealing part having a shape approximately the same as a shape of a gap between the mounting portion and the mounting port and has an interference fit with the gap, to seal the gap between the mounting portion and the mounting port.

Embodiments of a second aspect of the present disclosure provide a ventilation assembly. The ventilation assembly includes: a volute having a mounting port arranged to a surface thereof; and a filter assembly. The filter assembly includes: a filter screen configured to filter air; a supporting portion configured to support the filter screen; a mounting portion configured to mount the filter assembly to the mounting port or to a portion of the volute adjacent to the mounting port, wherein a shape and a size of the mounting portion matching with those of the mounting port to cover the mounting port. The mounting portion includes a sealing part having a shape approximately the same as a shape of a gap between the mounting portion and the mounting port and has an interference fit with the gap, to seal the gap between the mounting portion and the mounting port.

Embodiments of a third aspect of the present disclosure provide an air-conditioning apparatus, and the air-conditioning apparatus includes a ventilation assembly. The ventilation assembly includes: a volute having a mounting port arranged to a surface thereof; and a filter assembly. The filter assembly includes: a filter screen configured to filter air; a supporting portion configured to support the filter screen; a mounting portion configured to mount the filter assembly to the mounting port or to a portion of the apparatus adjacent to the mounting port, wherein a shape and a size of the mounting portion matching with those of the mounting port to cover the mounting port. The mounting portion includes a sealing part having a shape approximately the same as a shape of a gap between the mounting portion and the mounting port and has an interference fit with the gap, to seal the gap between the mounting portion and the mounting port.

BRIEF DESCRIPTION OF THE DRAWINGS

In order to more clearly explain technical solutions in embodiments of the present disclosure or in the related art, the drawings needed to be used in descriptions of the embodiments or the related art will be introduced briefly. Obviously, the drawings in the following descriptions are merely some embodiments of the present disclosure. For those ordinary skilled in the related art, other drawings may be obtained according to theses drawings without creative labors.

DETAILED DESCRIPTION

Technical solutions of the present disclosure will be described clearly and completely in combination with the accompanying drawings. It is obvious that the described embodiments are part of the embodiments of the present disclosure, instead of all embodiments of the present disclosure. Based on the embodiments of the present disclosure, all other embodiments obtained by those skilled in the related art without making inventive work belong to the protection scope of the present disclosure. In addition, the technical features involved in the different embodiments of the present disclosure described below may be combined with each other as long as there is no conflict between them.

In an enclosed indoor space such as an office, a bedroom, etc., an air quality gradually declines, and staying in the enclosed space for a long period of time tends to cause discomfort of the human body. Therefore, the indoor air needs to be replaced, and hence an air-conditioning apparatus with a fresh air function may be used to exchange outdoor fresh air with the indoor dirty air.

Figure 1:
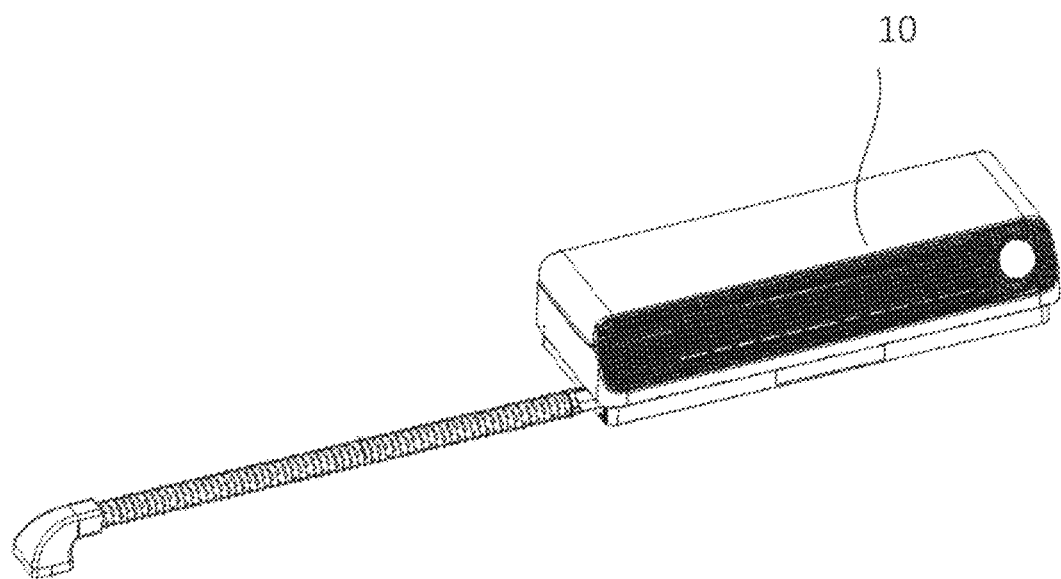
FIG. 1 is a schematic view of an air-conditioning apparatus in a related art.
Figure 2:
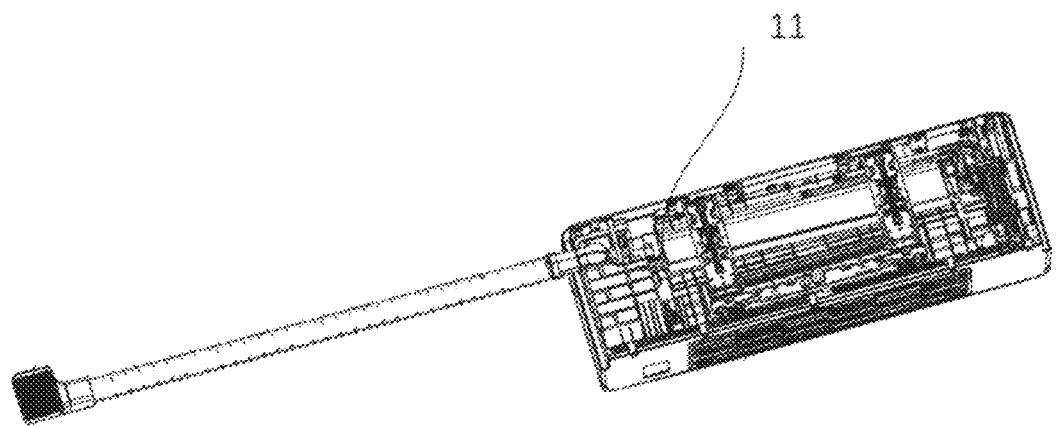
FIG. 2 is an exploded view of the air-conditioning apparatus in FIG. 1.

As illustrated in FIG. 1 and FIG. 2, for the air-conditioning apparatus with a fresh air function, taking an air conditioner as an example, a ventilation assembly is arranged in an indoor unit 10 of the air conditioner, and an end of an air input pipe of the indoor unit 10 is connected with the ventilation assembly 11, so as to guide an air flow from an outdoor environment into the ventilation assembly 11.

When the temperature difference between indoor and outdoor is large (for example, the outdoor temperature is lower than −20° C.), cold air flow entering ventilation assembly 11 will leak from a gap due to a poor sealing of the ventilation assembly 11. This may cause warm air in the air-conditioning apparatus to liquefy when meeting the cold air flow, thus resulting in condensation. When the condensation is serious, the condensation will form droplets, which will drip to a user's indoor floor, and even flow to a wall to form water stains, thus affecting the user experience.

In order to overcome the above defects, the embodiments of the present disclosure provide a filter assembly and an air-conditioning apparatus to solve the problem of condensation.

According to a first aspect, the embodiments of the present disclosure provide a filter assembly.

Figure 3:
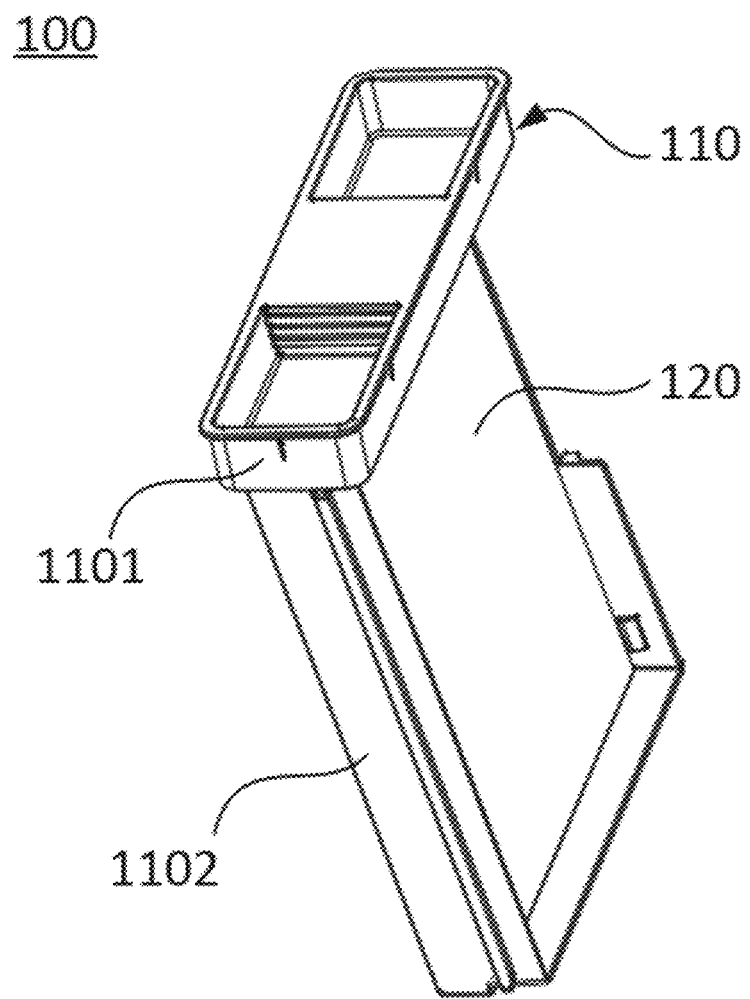
FIG. 3 is a schematic view of a filter assembly according to some embodiments of the present disclosure.
Figure 4:
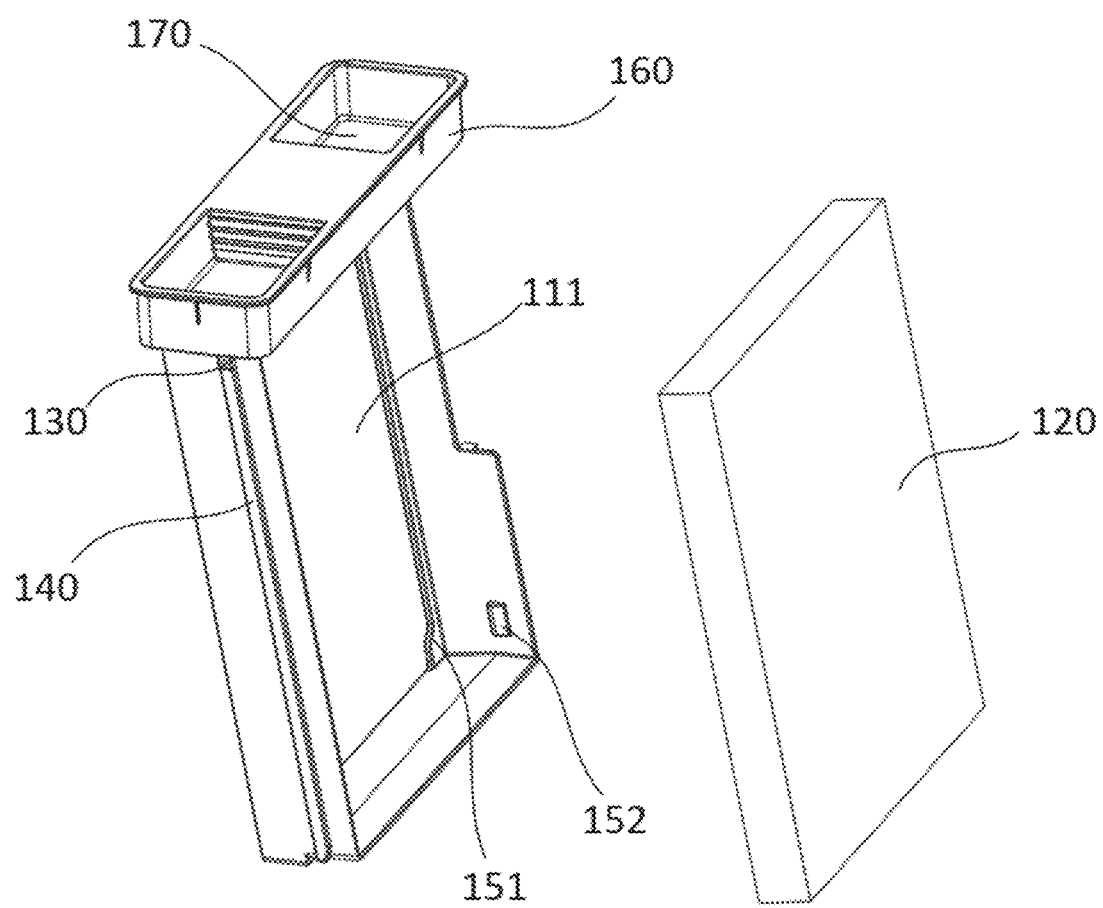
FIG. 4 is an exploded view of a filter assembly according to some embodiments of the present disclosure.

Referring to FIGS. 3 and 4, in some embodiments, the filter assembly 100 includes a filter screen 120 and a bracket, and the filter screen 120 is configured for filtering air. The bracket includes a supporting portion 1102 and a mounting portion 1101, the supporting portion 1102 is configured for supporting the filter screen 120 arranged to the supporting portion 1102, the mounting portion 1101 is configured for mounting the filter assembly to a mounting port of an apparatus to be provided with the filter assembly or to a portion of the apparatus adjacent to the mounting port, and a shape and a size of the mounting portion match with those of the mounting port to cover the mounting port.

The mounting portion 1101 includes a sealing part 300, and the sealing part 300 has a shape approximately the same with a shape of a gap between the mounting portion 1101 and the mounting port and has an interference fit with the gap, so as to seal the gap between the mounting portion 1101 and the mounting port.

The apparatus to be provided with the filter assembly refers to any structure suitable to equipped with the filter assembly 100, such as an air-conditioner volute, a ventilation assembly of a fresh air ventilator, etc., which is not limited in the present disclosure. The bracket is configured to mount and support the filter screen. The function of the filter assembly is to purify air. The filter screen 120 is a multi-layer filter screen structure. For example, the filter screen 120 may adopt a multi-layer composite filter screen of activated carbon and HEPA.

Significant effects of the embodiments of the present disclosure lie in: the filter assembly 100 includes the sealing part arranged to the mounting portion, to seal the gap between the filter assembly and the mounting port of the ventilation assembly, realize the sealing assembling between the filter assembly and the mounting port, and improve the sealing performance of the ventilation assembly, so as to prevent the air flow entering the volute from outside through the mounting port from leaking out from the gap between the filter assembly and the volute when the ventilation assembly operates, thus greatly reducing the condensation when the temperature difference between indoor and outdoor is large, and improving the user experience.

In another embodiment of the present disclosure, after the filter assembly is mounted to the mounting port, the sealing part 300 abuts against and is in the interference fit with an edge of the mounting port.

In another embodiment of the present disclosure, the sealing part 300 is made of an elastic material, and the rest of the mounting portion 1101 except the sealing part 300 is made of a rigid material. The mounting portion 1101 and the sealing part 300 are bonded, welded or integrally molded.

In this embodiment, the elastic material refers to a material having a low hardness and configured to be elastically deformed under an action of an external force, such as rubber, plastic, silica gel, etc. The sealing part adopts the elastic material so as to realize the interference fit by using the elasticity of the material, thus sealing the gap of the mounting port and improving the sealing effect. The rigid material refers to a material which is hard compared with the elastic material and tends not to be deformed under the action of the external force, such as hard plastic, composite material, wood material, metal material, etc. The mounting portion 1101 and the sealing part 300 may be integrally molded by a two-color injection molding process.

Figure 5:
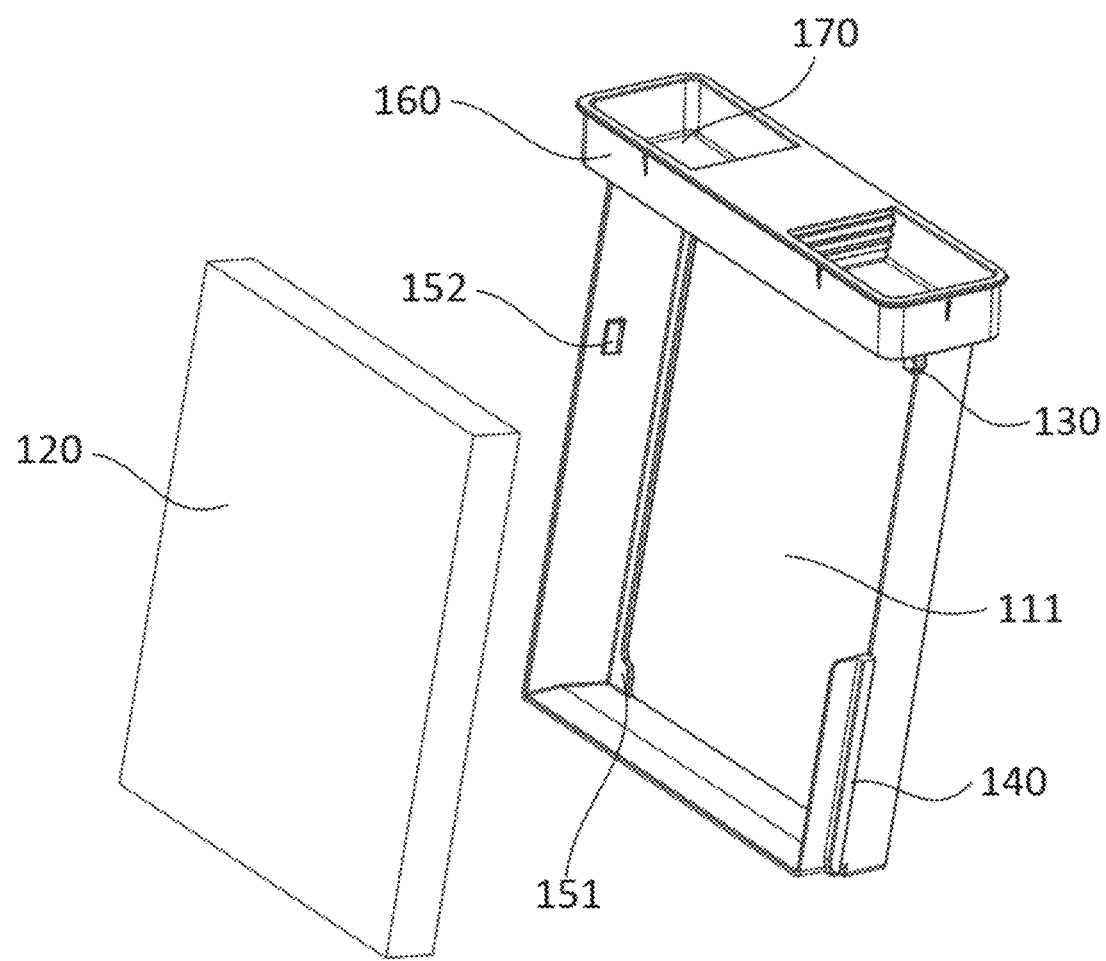
FIG. 5 is an exploded view of a filter assembly according to some embodiments of the present disclosure.
Figure 6:
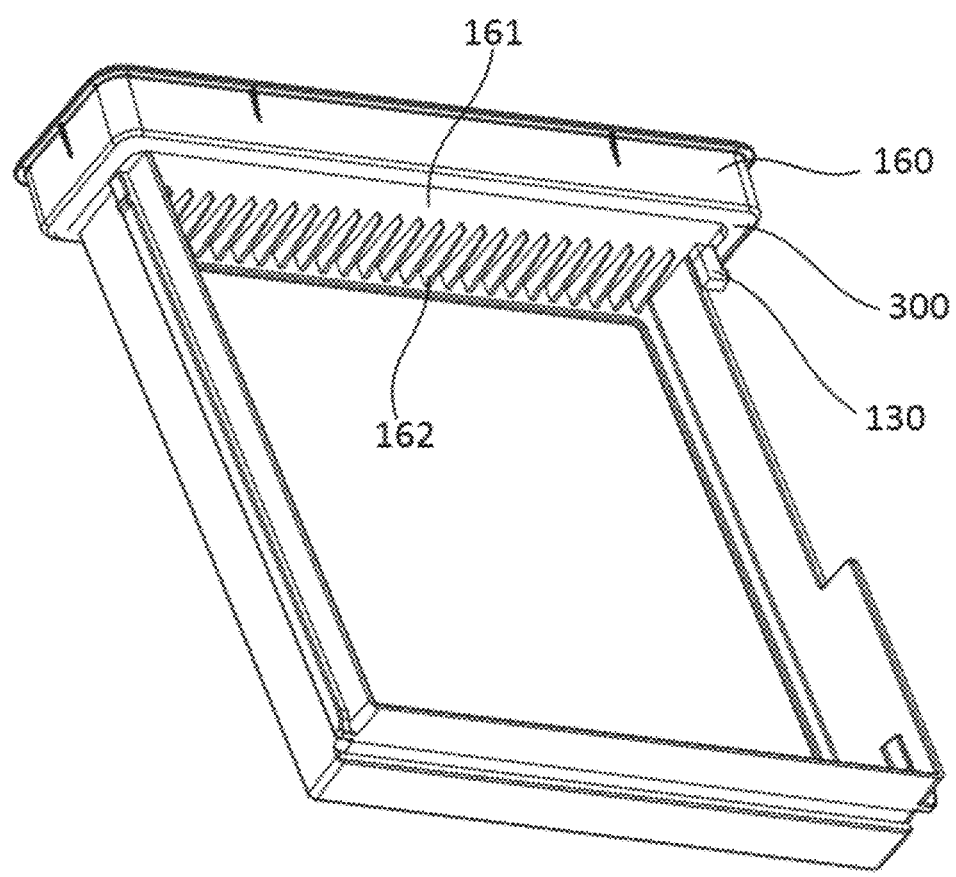
FIG. 6 is a schematic view of a sealing part according to some embodiments of the present disclosure.

Referring to FIG. 4 to FIG. 6, in another embodiment of the present disclosure, the mounting portion 1101 further includes a first part 161 and a second part 160. The first part 161 has a plate shape or an approximate plate shape. A shape and a size of the first part 161 match with those of the mounting port to substantially cover the mounting port. The second part 160 has a tubular shape or an approximately tubular shape. A shape and a size of the second part 160 match with those of the mounting port to be embedded in the mounting port. The sealing part 300 has a ring shape or an approximate ring shape along a periphery of the first part 161. An inner ring edge of the sealing part 300 is bonded, welded or integrally molded with the first part 161 and an outer ring edge of the sealing part 300 is bonded, welded or integrally molded with the second part 160.

In this embodiment, as illustrated in FIG. 6, a lower end of the second part 160 is connected with the sealing part 300 by either bonding, welding or integral molding, and the periphery of the first part 161 is connected with the sealing part 300 by either bonding, welding or integral molding. In the example of FIG. 6, the sealing part 300 surrounds an edge of the first part 161 to form a shape of a rectangular ring.

In an alternative embodiment, there are differences from the embodiment in FIG. 6, which lie in that the first part and the sealing part are molded to a lower end face of the second part 160 in the embodiment in FIG. 6, while a side wall surface of the second part 160 serves as the first part in the alternative embodiment, that is, the sealing part may be molded to the side wall surface of the second part. Thus, when the bracket is assembled with the mounting port, the sealing part abuts against the side wall of the mounting port with the interference fit, so as to realize the sealing of the mounting port. On the basis of the above disclosure, those skilled in the related art may understand and implement the alternative solution, which will not be repeated herein.

It should be noted that in the embodiment in which the sealing part 300 and the mounting portion 1101 are integrally molded, the sealing part 300 and the mounting portion adopt different injection materials, respectively, and the two-color injection molding process is used. For example, the process is presented as follows: the hard material is first adopted for injection molding to form the relatively hard mounting portion, and then the soft elastic material is adopted for secondary injection molding on the mounting portion to form the elastic sealing part 300.

In another embodiment of the present disclosure, considering that the filter assembly 100 needs to be replaced or cleaned irregularly and needs to be manually detached by the user, the mounting portion of the filter assembly may be connected in a detachable manner so as to facilitate the detachment by the user. For example, in an embodiment, the mounting portion 1101 is provided with a first engaging structure configured to be engaged with a second engaging structure arranged to the apparatus to be provided the filter assembly.

Figure 8:
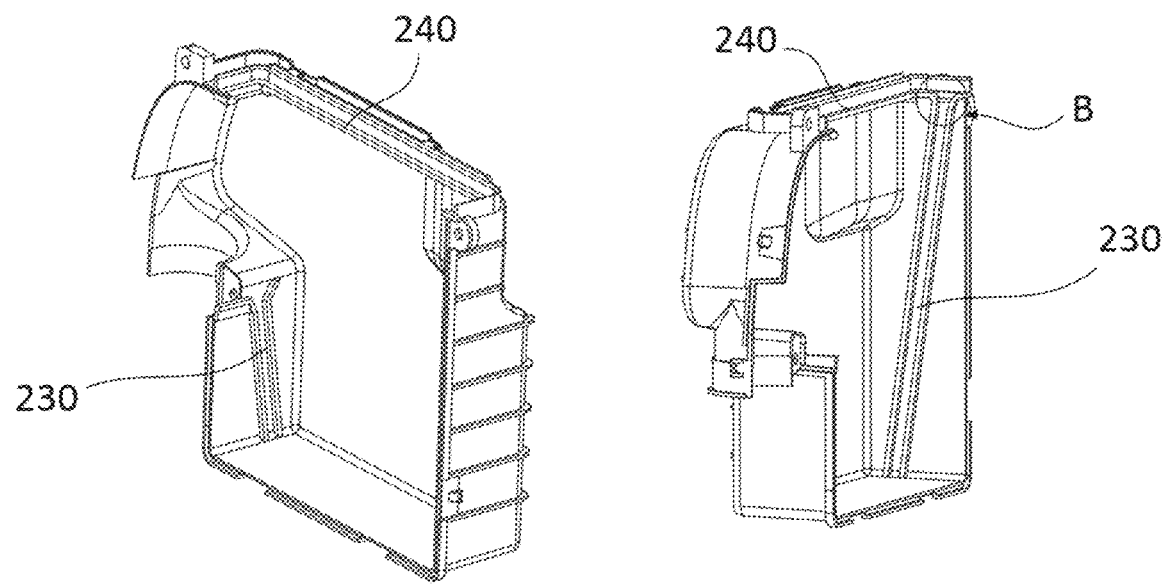
FIG. 8 is a schematic view of separate structures of a volute according to some embodiments of the present disclosure.
Figure 9:
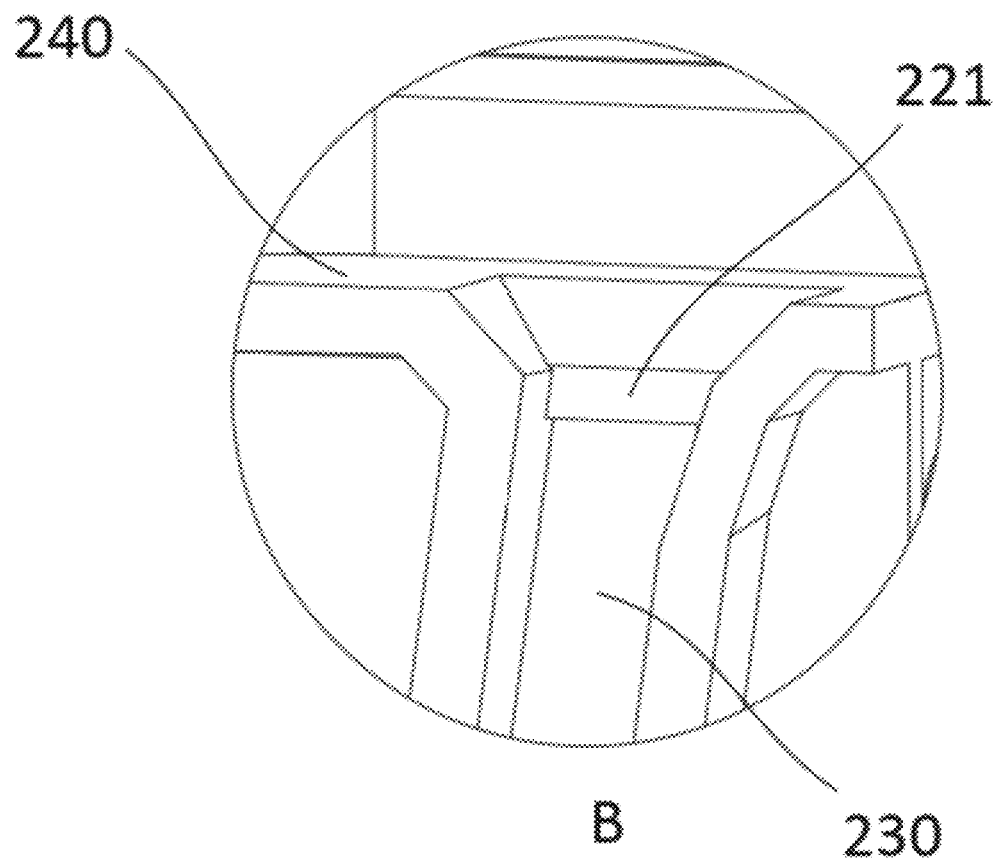
FIG. 9 is a partial enlarged view of portion B in FIG. 8.

As illustrated in FIG. 4 to FIG. 6, the first engaging structure is provided to the bracket 110. In this embodiment, the first engaging structure includes snaps 130 arranged at both ends of the lower end face of the mounting portion 1101, respectively. Accordingly, the mounting port of a volute 210 is correspondingly provided with the second engaging structure, as illustrated in FIG. 8 and FIG. 9. FIG. 9 is an enlarged view of a section B of FIG. 8. In this embodiment, the second engaging structure includes an engaging slot 221 arranged at the mounting port of the volute 210. When the bracket 110 is assembled into the volute 210 and the bracket is assembled in place, the snap 130 of the bracket 110 is engaged in the engaging slot 221 of the volute 210.

In an example, the snap 130 may be an elastic snap to facilitate the mounting and detachment of the bracket. Of course, it may also be understood that the function of the first engaging structure and the second engaging structure is to realize a fixed assembling of the filter assembly and the apparatus to be provided with the filter assembly, while their specific structures are not limited to the above examples, and may also be any other detachable connection structures suitable to be implemented, which is not limited herein.

In another embodiment of the present disclosure, a force-applied structure to which an external force is adapted to be applied is also provided to a surface of the mounting portion 1101 of the bracket 110 away from the supporting portion 1102, so that it is convenient for the user to take the filter assembly when mounting and detaching the filter assembly.

As illustrated in FIG. 4 and FIG. 5, in this embodiment, the force-applied structure includes two grasping grooves 170 formed in the surface of the mounting portion 1101, and an inner wall of the grasping groove 170 may also be provided with a corresponding friction structure to increase the friction between the user's hand and the bracket 110, such that it is more convenient for the user to apply the force to the bracket, which is convenient for the user to mount and detach the filter assembly 100.

In another embodiment of the present disclosure, considering that the filter screen needs to be replaced or cleaned irregularly, the filter screen and the supporting portion are connected in a detachable manner. When the user replaces the filter screen, the used filter screen may be removed from the supporting portion for replacement or cleaning. In this embodiment, the mounting portion 1101 and the supporting portion 1102 are connected to form a closed frame. The filter screen 120 is arranged in an inner space 111 of the frame, and the supporting portion 1102 is provided with a limiting structure which is configured for limiting a position of the filter screen 120.

In another embodiment of the present disclosure, the supporting portion 1102 is formed as a semi-closed frame, and the limiting structure includes a supporting rim 151 arranged to an inner side wall of the supporting portion 1102 and located at a side away from a windward surface of the filter screen, and a limiting protrusion 152 arranged to the inner side wall of the supporting portion 1102 and spaced apart from the supporting rim 151. The supporting rim 151 and the limiting protrusion 152 abut against the filter screen, respectively.

As illustrated in FIG. 4 and FIG. 5, in this embodiment, the limiting structure includes the supporting rim 151 and the limiting protrusion 152 located at a front side and a rear side of the bracket 110 in a thickness direction, respectively. Thus, when the filter screen 120 is assembled into the bracket 110, the supporting rim 151 may abut against a rear side surface of the filter screen 120 for limiting, and the limiting protrusion 152 abuts against a front side surface of the filter screen 120 for limiting. In other words, the supporting rim 151 and the limiting protrusion 152 abut against the two opposite surfaces of the filter screen 120, respectively, so as to prevent the filter screen from falling out of the bracket 110.

In another embodiment of the present disclosure, several rib plates 162 are provided on the first part 161. On one hand, the rib plates 162 may increase the structural strength of the first part 161, and on the other hand, the rib plates 162 may abut against the filter screen 120 after the filter screen 120 is assembled, so as to further ensure the stability and firmness of the assembling of the filter screen 120.

According to a second aspect, the embodiment of the present disclosure provides a ventilation assembly. In some embodiments, the ventilation assembly of the present disclosure includes a volute 210 and a filter assembly 100 in any one of the above embodiments. A mounting port is arranged to a surface of the volute 210, and the filter assembly 100 is mounted to the mounting port or to a portion of the volute 210 adjacent to the mounting port.

In another embodiment of the present disclosure, the ventilation assembly further includes a fan arranged in the volute 210 and configured to allow an external air to flow into or out of the volute.

In another embodiment of the present disclosure, the supporting portion 1102 of the filter assembly 100 is provided with a first guiding-limiting structure, and an inner wall of the volute 210 is provided with a second guiding-limiting structure fitted with the first guiding-limiting structure. The first guiding-limiting structure and the second guiding-limiting structure are fitted with each other to guide the supporting portion 1102 to move into the volute 210 along a direction defined by the first guiding-limiting structure and the second guiding-limiting structure.

Figure 7:
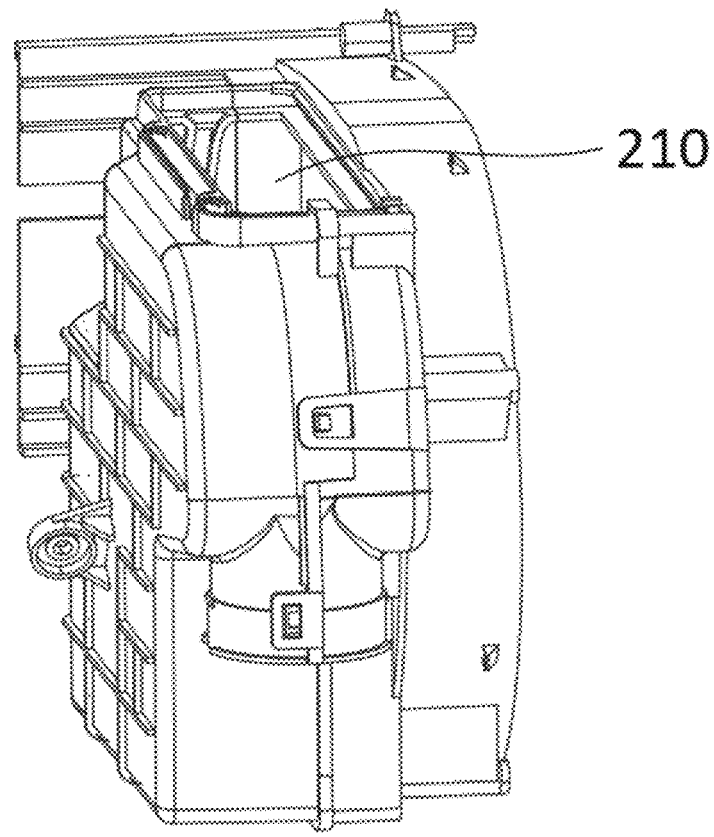
FIG. 7 is a schematic view of a ventilation assembly of a volute according to some embodiments of the present disclosure.

Referring to FIG. 7 to FIG. 9, the first guiding-limiting structure is arranged to an outer side wall of the supporting portion 1102 of the bracket 110. Accordingly, an inner side wall of the volute 210 is correspondingly provided with the second guiding-limiting structure. When the bracket 110 is assembled with the volute 210, the first guiding-limiting structure is slidingly fitted with the second guiding-limiting structure.

In another embodiment of the present disclosure, the first guiding-limiting structure includes at least one guide bar 140. The second guiding-limiting structure includes a guide groove 230 formed in the inner side wall of the volute 210, and a shape and a size of the guide bar 140 match with those of the guide groove 230, such that the guide bar 140 can be embedded into the guide groove 230 and move along the guide groove 230.

As illustrated in FIG. 4 and FIG. 5, in this embodiment, the outer side walls at left and right sides of the supporting portion of the bracket 110 are both provided with the guide bar 140, and the guide bar 140 is a strip structure protruding from the surface of the bracket 110. As illustrated in FIG. 8, the guide groove 230 is correspondingly provided on the inner side wall of the volute and the shape of the guide groove 230 matches with the shape of the guide bar 140. Therefore, when the bracket 110 is assembled with the volute 210, the guide bar 140 and the guide groove 230 are slidingly fitted to form a guide rail structure, such that the bracket 110 can be assembled smoothly and successfully.

Of course, those skilled in the related art may understand that the first guiding-limiting structure and the second guiding-limiting structure are not limited to the guide bar and the guide groove in the above examples, and the first guiding-limiting structure may also be a guide groove arranged to the bracket, while the second guiding-limiting structure may be a guide bar arranged to the volute, which is not limited herein.

It may be known from the above description that the filter assembly 100 of the embodiments of the present disclosure includes the first guiding-limiting structure to be fitted with the second guiding-limiting structure on the volute of the ventilation assembly 11, so as to provide the guide rail structure for the assembling of the bracket, such that the bracket can be assembled smoothly and successfully, thus preventing shaking and jamming in the assembling process, and improving the user experience.

In another embodiment of the present disclosure, the mounting port of the volute 210 is provided with a ring-shaped sealing step 240 formed along an edge of the mounting port, and a shape and a size of the sealing step 240 match with those of the sealing part 300, such that the sealing part 300 and the sealing step 240 abut against each other to form a sealing surface, after the filter assembly is mounted to the volute 210.

In combination with FIG. 6, FIG. 8 and FIG. 9, after the bracket 110 is assembled into the volute 210, the sealing part 300 on the first part 161 at a lower end of the second part 160 abuts against an upper end face of the sealing step 240, and the interference fit is formed between the sealing part 300 and the sealing step 240. That is, the sealing part 300 is squeezed to produce an elastic deformation, so as to realize the sealing between the two contact surfaces, and prevent the condensation water in the volute 210 from leaking through the mounting port of the volute 210.

In addition, it may be understood that, in this embodiment, the sealing part 300 is integrally molded with the bracket 110 through, for example, the two-color injection molding process. Therefore, when the bracket 110 is assembled with the volute 210, it is unnecessary to provide additional parts such as sealing rings in the abutting structure between the bracket 110 and the volute 210, and the assembling of the filter assembly 100 and the sealing of the mounting port of the volute 210 can be realized directly by one-time assembling.

According to a third aspect, the embodiment of the present disclosure provides an air-conditioning apparatus, including a ventilation assembly in any one of the above embodiments. The air-conditioning apparatus of the present disclosure may be an air purifier, a fresh air ventilator, an air conditioner, etc., which is not limited herein.

Figure 10:
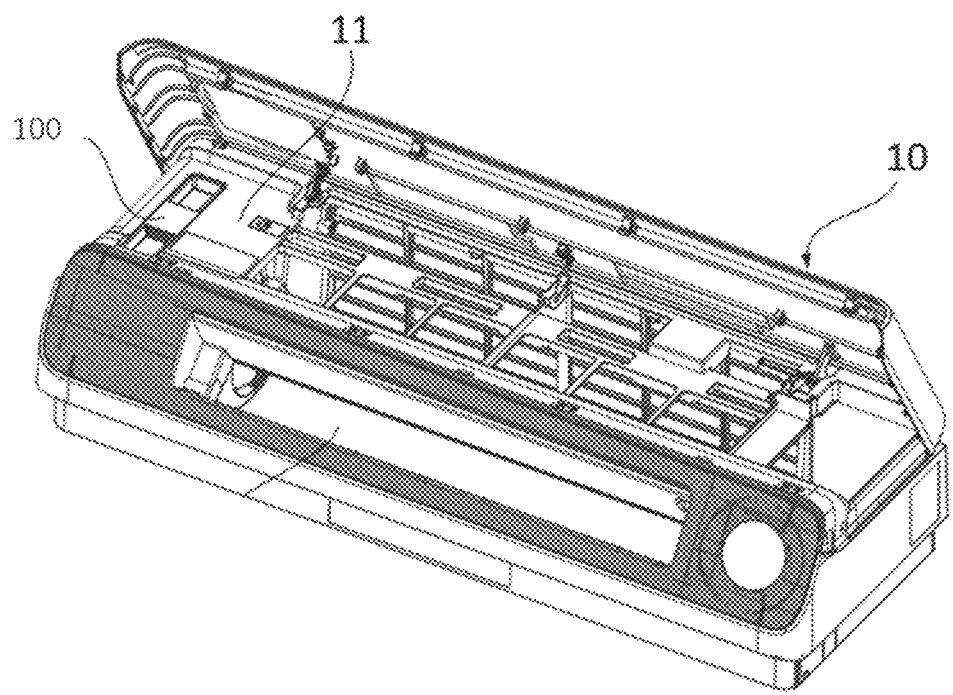
FIG. 10 is a schematic view of a ventilation assembly having a filter assembly and a volute in an air-conditioning apparatus according to some embodiments of the present disclosure.
Figure 11:
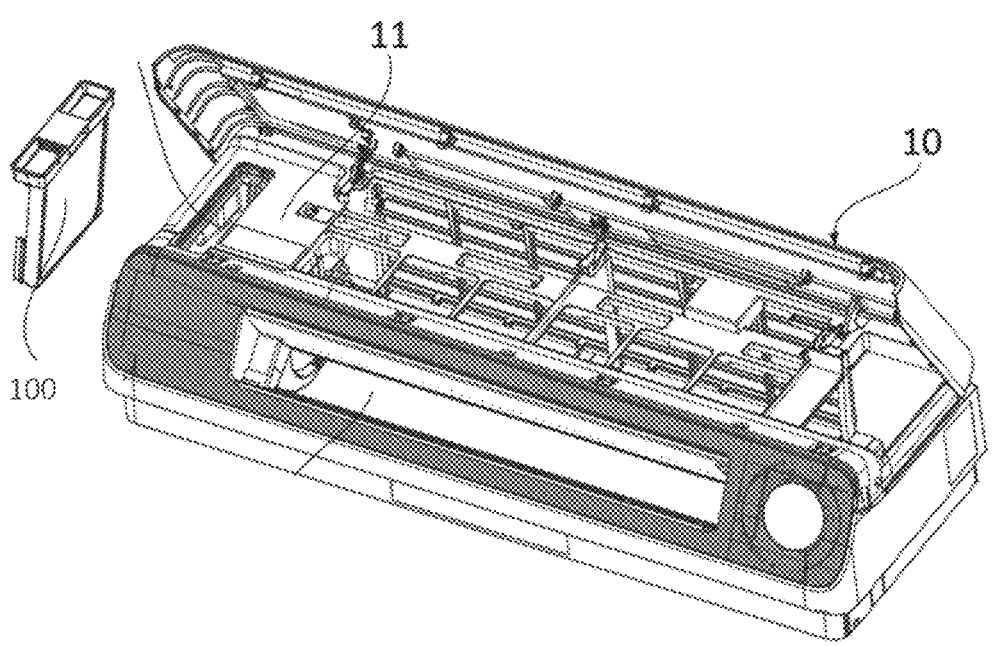
FIG. 11 is an exploded view of a filter assembly and a volute in an air-conditioning apparatus according to some embodiments of the present disclosure.

In some embodiments, referring to FIG. 10 and FIG. 11, taking a fresh air conditioner as an example, the ventilation assembly 11 is a fresh air system of the air conditioner.

The air-conditioning apparatus provided by the embodiments of the present disclosure realizes the sealing assembling of the filter assembly and the volute through the sealing part, improves the sealing performance of the fresh air system, and prevents the condensation of the fresh air system due to the too large temperature difference between indoor and outdoor.

Obviously, the above embodiments are merely examples for clear explanations, which cannot be construed as a limitation of the embodiments. For those ordinary skilled in the related art, other modifications or changes in different forms may be made on the basis of the above description, and it is unnecessary and impossible to enumerate all the embodiments herein. The obvious modifications or changes arising therefrom are still within the scope of protection created by the present disclosure.

What is claimed is:

1. A filter assembly, comprising:
   a filter screen configured to filter air;
   a supporting portion configured to support the filter screen; and
   a mounting portion configured to mount the filter assembly to a mounting port of an apparatus to be provided with the filter assembly or to a portion of the apparatus adjacent to the mounting port, wherein a shape and a size of the mounting portion match with those of the mounting port to cover the mounting port,
   wherein the mounting portion comprises a sealing part having a shape approximately the same as a shape of a gap between the mounting portion and the mounting port and having an interference fit with the gap, to seal the gap between the mounting portion and the mounting port,
   wherein the mounting portion further comprises:
   a first part having a plate shape or an approximate plate shape, the first part having the shape and size matching with those of the mounting port to approximately cover the mounting port; and
   a second part having a tubular shape or an approximately tubular shape, the second part having the shape and size matching with those of the mounting port to be embedded in the mounting port,
   wherein the sealing part has a ring or approximate ring shape along a periphery of the first part, an inner ring edge of the sealing part is bonded, welded or integrally molded with the first part, and an outer ring edge of the sealing part is bonded, welded or integrally molded with the second part.

2. The filter assembly according to claim 1, wherein the sealing part is configured to abut against and be in the interference fit with an edge of the mounting port after the filter assembly is mounted to the mounting port.

3. The filter assembly according to claim 1, wherein the sealing part is made of an elastic material, and rest of the mounting portion except the sealing part is made of a rigid material;
   the mounting portion and the sealing part are bonded, welded or integrally molded.

4. The filter assembly according to claim 1, wherein rib plates are arranged to the first part and configured to abut against the filter screen.

5. The filter assembly according to claim 1, wherein the mounting portion is provided with a first engaging structure configured to be engaged with a second engaging structure arranged to the apparatus to be provided with the filter assembly.

6. The filter assembly according to claim 1, wherein the mounting portion and the supporting portion are connected to form a closed frame;
the filter screen is arranged in the frame;
the supporting portion is provided with a limiting structure configured to limit a position of the filter screen.

7. The filter assembly according to claim 6, wherein the supporting portion is configured as a semi-closed frame;
the limiting structure comprises:
a supporting rim arranged to an inner side wall of the supporting portion and located at a side away from a windward surface of the filter screen; and
a limiting protrusion arranged to the inner side wall of the supporting portion,
wherein the supporting rim and the limiting protrusion abut against the filter screen, respectively.

8. The filter assembly according to claim 7, wherein the supporting rim and the limiting protrusion are spaced part from each other, and abut against two opposite surfaces of the filter screen, respectively.

9. The filter assembly according to claim 1, further comprising two grasping grooves formed in a surface of the mounting portion away from the supporting portion.

10. A ventilation assembly, comprising:
a housing having a mounting port arranged to a surface thereof; and
a filter assembly comprising:
a filter screen configured to filter air;
a supporting portion configured to support the filter screen; and
a mounting portion configured to mount the filter assembly to the mounting port or to a portion of the housing adjacent to the mounting port, wherein a shape and a size of the mounting portion match with those of the mounting port to cover the mounting port,
wherein the mounting portion comprises a sealing part having a shape approximately the same as a shape of a gap between the mounting portion and the mounting port and having an interference fit with the gap, to seal the gap between the mounting portion and the mounting port,
wherein the mounting portion further comprises:
a first part having a plate shape or an approximate plate shape, the first part having the shape and size matching with those of the mounting port to approximately cover the mounting port; and
a second part having a tubular shape or an approximately tubular shape, the second part having the shape and size matching with those of the mounting port to be embedded in the mounting port,
wherein the sealing part has a ring or approximate ring shape along a periphery of the first part, an inner ring edge of the sealing part is bonded, welded or integrally molded with the first part, and an outer ring edge of the sealing part is bonded, welded or integrally molded with the second part.

11. The ventilation assembly according to claim 10, wherein the supporting portion is provided with a first guiding-limiting structure;
an inner wall of the housing is provided with a second guiding-limiting structure fitted with the first guiding-limiting structure;
the first guiding-limiting structure and the second guiding-limiting structure are fitted with each other to guide the supporting portion to move into the housing along a direction defined by the first guiding-limiting structure and the second guiding-limiting structure.

12. The ventilation assembly according to claim 11, wherein the first guiding-limiting structure comprises at least one guide bar;
the second guiding-limiting structure comprises a guide groove arranged to the inner wall of the housing, a shape and a size of the guide bar match with those of the guide groove, and the guide bar is configured to be embedded in the guide groove and move along the guide groove.

13. The ventilation assembly according to claim 10, wherein the mounting port of the housing is provided with a ring-shaped sealing step formed along an edge of the mounting port,
a shape and a size of the sealing step match with those of the sealing part, and the sealing part and the sealing step are configured to abut against each other to form a sealing surface after the filter assembly is mounted to the housing.

14. The ventilation assembly according to claim 10, wherein the sealing part is configured to abut against and be in the interference fit with an edge of the mounting port after the filter assembly is mounted to the mounting port.

15. The ventilation assembly according to claim 10, wherein the sealing part is made of an elastic material, and rest of the mounting portion except the sealing part is made of a rigid material;
the mounting portion and the sealing part are bonded, welded or integrally molded.

16. The ventilation assembly according to claim 10, wherein the mounting portion and the supporting portion are connected to form a closed frame;
the filter screen is arranged in the frame;
the supporting portion is provided with a limiting structure configured to limit a position of the filter screen.

17. The ventilation assembly according to claim 16, wherein the supporting portion is configured as a semi-closed frame;
the limiting structure comprises:
a supporting rim arranged to an inner side wall of the supporting portion and located at a side away from a windward surface of the filter screen; and
a limiting protrusion arranged to the inner side wall of the supporting portion,
wherein the supporting rim and the limiting protrusion abut against the filter screen, respectively.

18. An air-conditioning apparatus, comprising a ventilation assembly, the ventilation assembly comprising:
a housing having a mounting port arranged to a surface thereof; and
a filter assembly comprising:
a filter screen configured to filter air;
a supporting portion configured to support the filter screen; and
a mounting portion configured to mount the filter assembly to the mounting port or to a portion of the housing adjacent to the mounting port, wherein a shape and a size of the mounting portion match with those of the mounting port to cover the mounting port, wherein the mounting portion comprises a sealing part having a shape approximately the same as a shape of a gap between the mounting portion and the mounting port and having an interference fit with the gap, to seal the gap between the mounting portion and the mounting port, wherein the mounting portion further comprises:
a first part having a plate shape or an approximate plate shape, the first part having the shape and size matching with those of the mounting port to approximately cover the mounting port; and
a second part having a tubular shape or an approximately tubular shape, the second part having the shape and size matching with those of the mounting port to be embedded in the mounting port,
wherein the sealing part has a ring or approximate ring shape along a periphery of the first part, an inner ring edge of the sealing part is bonded, welded or integrally molded with the first part, and an outer ring edge of the sealing part is bonded, welded or integrally molded with the second part.

* * * * *